United States Patent
Aldana

(10) Patent No.: US 10,349,367 B2
(45) Date of Patent: Jul. 9, 2019

(54) METHODS AND SYSTEMS FOR SYNCHRONIZING DEVICES

(71) Applicant: QUALCOMM Incorporated, San Diego, CA (US)

(72) Inventor: Carlos Horacio Aldana, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 331 days.

(21) Appl. No.: 14/850,459

(22) Filed: Sep. 10, 2015

(65) Prior Publication Data
US 2016/0262122 A1     Sep. 8, 2016

Related U.S. Application Data

(60) Provisional application No. 62/127,757, filed on Mar. 3, 2015.

(51) Int. Cl.
*H04J 3/06* (2006.01)
*H04W 24/10* (2009.01)
(Continued)

(52) U.S. Cl.
CPC ....... *H04W 56/0015* (2013.01); *H04J 3/0667* (2013.01); *H04W 24/10* (2013.01); *H04W 72/0446* (2013.01); *H04W 56/0035* (2013.01)

(58) Field of Classification Search
CPC . H04B 3/30; H04B 3/54; H04B 3/542; H04B 3/544; H04B 13/005; H04B 2203/5408; G06F 1/12; G06Q 10/06; G06Q 50/32; H04H 20/42; H04J 3/06; H04J 3/0667; H04J 3/0685; H04L 5/005; H04L 9/0861; H04L 12/26; H04L 25/024; H04L 69/22; H04W 24/10; H04W 40/244; H04W 52/0229; H04W 56/001; H04W 56/005; H04W 56/0015; H04W 56/0035;
(Continued)

(56) References Cited

U.S. PATENT DOCUMENTS 7,397,877 B2    7/2008  Miao
2008/0243934 A1  10/2008  Fou
(Continued)

OTHER PUBLICATIONS

Garner G.M., et al.,"New Simulation and Test Results for IEEE 802.1AS Timing Performance," Precision Clock Synchronization for Measurement, Control and Communication, 2009. ISPCS 2009. International Symposium on, IEEE, Piscataway, NJ, USA, Oct. 12, 2009 (Oct. 12, 2009), pp. 1-7, XP031570878, ISBN: 978-1-4244-4391-8.

(Continued)

*Primary Examiner* — Marsha D Banks Harold
*Assistant Examiner* — Dharmesh J Patel
(74) *Attorney, Agent, or Firm* — Hunter Clark PLLC

(57) ABSTRACT

Disclosed are methods and systems for synchronizing clocks maintained at different devices in a wireless communication network. A first wireless transceiver device may receive one or more messages from a second wireless transceiver device with parameters indicative of a first clock state. The first wireless transceiver device may then synchronize a second clock state maintained at the first wireless device based, at least in part, on the one or more parameters indicative of the first clock state.

27 Claims, 12 Drawing Sheets

(51) Int. Cl.
*H04W 56/00* (2009.01)
*H04W 72/04* (2009.01)

(58) Field of Classification Search
CPC ............ H04W 56/0065; H04W 64/00; H04W 72/0446; H04W 74/002; H04W 74/04; H04W 80/00; H04W 84/18; H04W 88/08
See application file for complete search history.

(56) References Cited

U.S. PATENT DOCUMENTS

| | | |
|---|---|---|
| 2009/0243934 A1 | 10/2009 | Ameti et al. |
| 2013/0163453 A1* | 6/2013 | Lin et al. |
| 2014/0068315 A1 | 3/2014 | Aweya et al. |
| 2014/0254511 A1 | 9/2014 | Aldana et al. |
| 2014/0286291 A1 | 9/2014 | Einhaus et al. |
| 2015/0092793 A1 | 4/2015 | Aweya |
| 2015/0215031 A1* | 7/2015 | Dalvi ................ H04W 56/0015 370/324 |
| 2015/0382152 A1 | 12/2015 | Lindskog et al. |

OTHER PUBLICATIONS

International Search Report and Written Opinion—PCT/US2016/017640—ISA/EPO—dated Jun. 9, 2016.

* cited by examiner

| Category | Public Action | Dialog Token | Follow Up Dialog Token | TOD | TOA |
|---|---|---|---|---|---|
| 1 | 1 | 1 | 1 | 6 | 6 |

Octets:

| TOD Error | TOA Error | LCI Report (optional) | Location Civic Report (optional) | Fine Timing Measurement Parameters (optional) | Vendor proprietary containing FollowupInformation |
|---|---|---|---|---|---|
| 2 | 2 | variable | variable | variable | |

Octets:

FIG. 6

| Category | Public Action | Trigger | LCI Measurement Request (optional) | Location Civic Measurement Request (optional) | Fine Timing Measurement Parameters (optional) |
|---|---|---|---|---|---|
| 1 | 1 | 1 | variable | variable | variable |

Octets:

FIG. 7

| Category | WNM Action | Trigger | Fine Timing Measurement Parameters (optional) |
|---|---|---|---|
| Octets: 1 | 1 | 1 | |

FIG. 8

| Category | Action | Dialog Token | Follow Up Dialog Token | TOD |
|---|---|---|---|---|
| Octets: 1 | 1 | 1 | 1 | 4 |

| TOA | Max TOD Error | Max TOA Error | Fine Timing Measurement Parameters (optional) | Vendor proprietary containing FollowUpInformation (optional) |
|---|---|---|---|---|
| Octets: 4 | 1 | 1 | | |

FIG. 9

| 8 | 7 | 6 | 5 | 4 | 3 | 2 | 1 | Octets | Offset |
|---|---|---|---|---|---|---|---|---|---|
| header (see 11.4.2) | | | | | | | | 34 | 0 |
| preciseOriginTimestamp | | | | | | | | 10 | 34 |
| Follow_up information TLV | | | | | | | | 32 | 44 |

FIG. 12

| | | | Bits | | | | | Octets | Offset |
|---|---|---|---|---|---|---|---|---|---|
| 8 | 7 | 6 | 5 | 4 | 3 | 2 | 1 | | |
| transportSpecific | | | | messageType | | | | 1 | 0 |
| reserved | | | | versionPTP | | | | 1 | 1 |
| messageLength | | | | | | | | 2 | 2 |
| domainNumber | | | | | | | | 1 | 4 |
| reserved | | | | | | | | 1 | 5 |
| flags | | | | | | | | 2 | 6 |
| correctionField | | | | | | | | 8 | 8 |
| reserved | | | | | | | | 4 | 16 |
| sourcePortIdentity | | | | | | | | 10 | 20 |
| sequenceID | | | | | | | | 2 | 30 |
| control | | | | | | | | 1 | 32 |
| logMessageInterval | | | | | | | | 1 | 33 |

FIG. 13

| Bits | Octets | Offset |
|---|---|---|
| 8 7 6 5 4 3 2 1 | | |
| tlvType | 2 | 0 |
| lengthField | 2 | 2 |
| organizationID | 3 | 4 |
| organizationSubType | 3 | 7 |
| cummulativeScaledRateOffset | 4 | 10 |
| gmTimeBaseIndicator | 2 | 14 |
| lastGmPhaseChange | 12 | 16 |
| scaledlastGmFreqChange | 4 | 28 |

METHODS AND SYSTEMS FOR SYNCHRONIZING DEVICES

CROSS-REFERENCE TO RELATED APPLICATIONS

This application claims the benefit of U.S. Provisional Application No. 62/127,757, entitled "Methods and Systems for Ranging Protocol," filed Mar. 3, 2015, which is assigned to the assignee hereof and which is expressly incorporated herein by reference.

BACKGROUND

Field

Embodiments described herein are directed to obtaining measurements of signals acquired from a mobile transmitter.

Information

Satellite positioning systems (SPSs), such as the global positioning system (GPS), have enabled navigation services for mobile handsets in outdoor environments. Likewise, particular techniques for obtaining estimates of positions of mobile device in indoor environments may enable enhanced location based services in particular indoor venues such as residential, governmental or commercial venues. For example, a range between a mobile device and a transceiver positioned at fixed location may be measured based, at least in part, on a measurement of a round trip time (RTT) measured between transmission of a first message from a first device to a second device and receipt of a second message at the first device transmitted in response to the first message.

BRIEF DESCRIPTION OF THE DRAWINGS

Non-limiting and non-exhaustive aspects are described with reference to the following figures, wherein like reference numerals refer to like parts throughout the various figures unless otherwise specified.

FIG. 6 is a diagram illustrating fields of a fine timing measurement (FTM) message according to particular embodiments.

FIG. 7 is a diagram illustrating fields of an FTM request message according to an embodiment.

FIG. 8 is a diagram illustrating fields of a timing measurement (TM) request message according to an embodiment.

FIG. 9 is a diagram illustrating fields of a TM message according to an embodiment.

FIGS. 12 through 14 are diagrams of fields of messages transmitted in a message according to an embodiment.

SUMMARY

Figure 1:
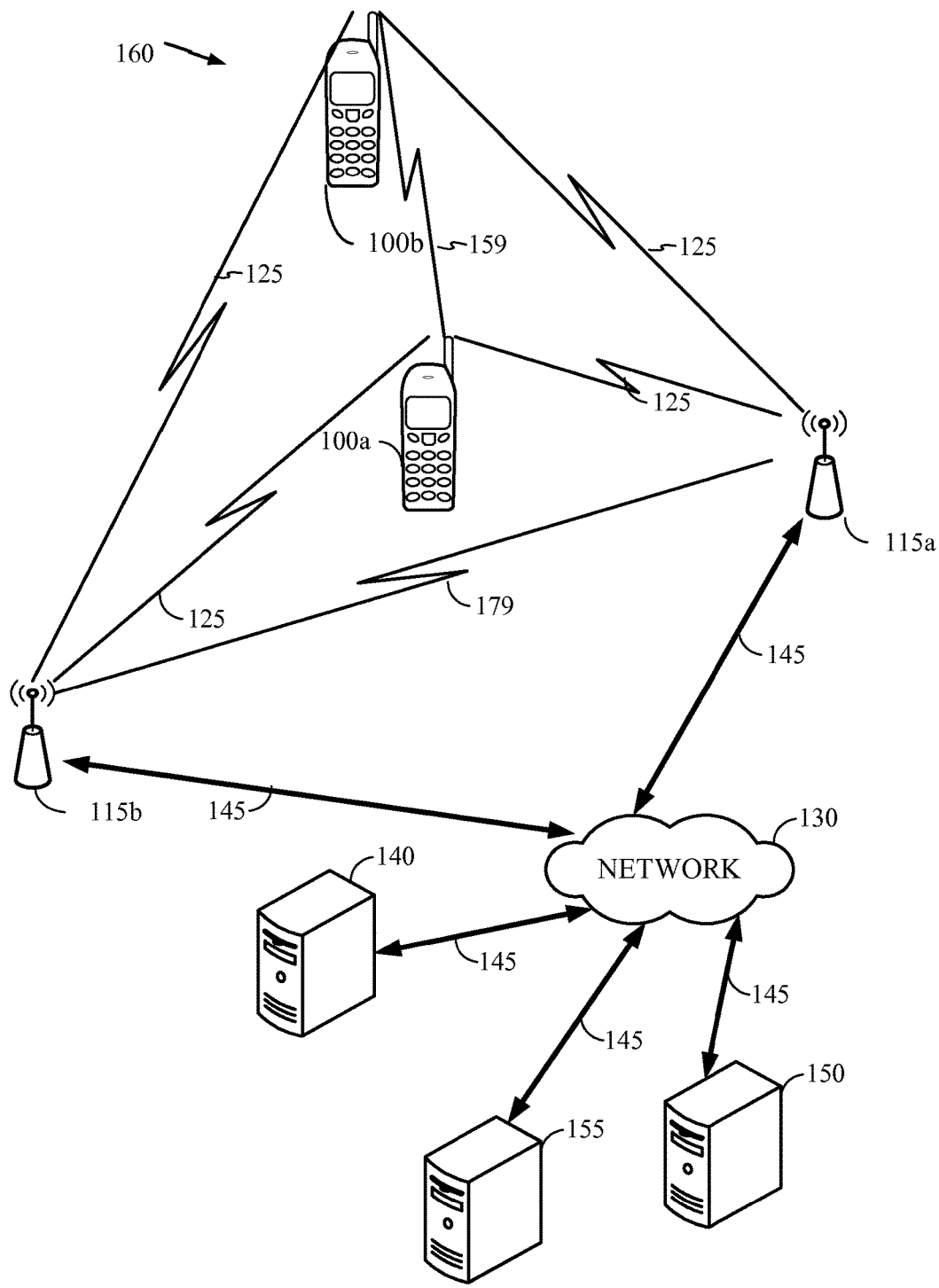
FIG. 1 is a system diagram illustrating certain features of a system containing a mobile device, in accordance with an implementation.

Briefly, particular implementations are directed to a method, at an first wireless station (STA), comprising: receiving one or more first messages from a second STA comprising one or more parameters characterizing a state of a grand master clock; and synchronizing a first clock maintained at the first STA with a second clock maintained at the second STA based, at least in part, on the one or more parameters characterizing the state of the grand master clock and an expected difference in a first drift of the first clock and a second drift of the second clock.

Another particular implementation is directed to an first wireless station (STA), comprising: a wireless transceiver to transmit messages to and receive messages from a wireless communication network; a first clock; and one or more processors configured to: obtain one or more first messages received at the wireless transceiver from a second STA comprising one or more parameters characterizing a state of a grand master clock; and synchronize a state of the first clock with a state of a second clock maintained at the second STA based, at least in part, on the one or more parameters characterizing the state of the grand master clock and an expected difference in a first drift of the first clock and a second drift of the second clock.

Another particular implementation is directed to a non-transitory storage medium comprising machine-readable instructions stored thereon which are executable by one or more processors of an first wireless station (STA) to: obtain one or more first messages received from a second STA comprising one or more parameters characterizing a state of a grand master clock; and synchronize a state of a first clock maintained at the first STA with a state of a second clock maintained at the second STA based, at least in part, on the one or more parameters characterizing the state of the grand master clock and an expected difference in a first drift of the first clock and a second drift of the second clock.

Another particular implementation is directed to an first wireless station (STA), comprising: means for receiving one or more first messages from a second STA comprising one or more parameters characterizing a state of a grand master clock; and means for synchronizing a first clock maintained at the first STA with a second clock maintained at the second STA based, at least in part, on the one or more parameters characterizing the state of the grand master clock and an expected difference in a first drift of the first clock and a second drift of the second clock.

Another particular implementation is directed to a method, at a second wireless station (STA), comprising: transmitting at least one first message to an first STA comprising one or more parameters characterizing a state of a grand master clock; and transmitting a burst of second messages to the first STA, wherein the second messages are time-stamped based, at least in part, on the state of the grand master clock.

Another particular implementation is directed to a second wireless station (STA), comprising: a wireless transceiver to transmit messages to and receive messages from a wireless communication network; and one or more processors configured to: initiate transmission of at least one first message through the transceiver to an first STA comprising one or more parameters characterizing a state of a grand master clock; and initiate transmission of a burst of second messages through the transceiver to the first STA, wherein the second messages are time-stamped based, at least in part, on the state of the grand master clock.

Another particular implementation is directed to a second wireless station (STA), comprising: means for transmitting at least one first message to an first STA comprising one or more parameters characterizing a state of a grand master clock; and means for transmitting a burst of second messages to the first STA, wherein the second messages are time-stamped based, at least in part, on the state of the grand master clock.

Another particular implementation is directed to a non-transitory storage medium comprising computer readable instructions stored thereon which are executable by a processor of a second wireless station (STA) to: initiate transmission of at least one first message to an first STA comprising one or more parameters characterizing a state of a grand master clock; and initiate transmission of burst of second messages to the first STA, wherein the second messages are time-stamped based, at least in part, on the state of the grand master clock.

It should be understood that the aforementioned implementations are merely example implementations, and that claimed subject matter is not necessarily limited to any particular aspect of these example implementations.

DETAILED DESCRIPTION

As discussed below, particular message flows may enable effective and efficient measurements of a round trip time (RTT) or time of flight (TOF) in connection with a transmission of messages between wireless stations (STAs). In a particular example, a STA may comprise any one of several types of transceiver devices such as, for example, a mobile user station (e.g., smartphone, notebook computer, wireless audio speaker device, tablet computer, etc.) or wireless service access device (e.g., wireless local area network (WLAN) access point, personal area network (PAN) or femto cell). Particular message flows and fields in message frames may enable obtaining RTT of TOF measurements with sufficient accuracy for measuring a range between the wireless STAs, for example. Such a measured range may be used in any one of several applications including positioning operations, for example.

In one particular implementation, a first wireless transceiver device may receive one or more first messages from a second wireless transceiver device comprising one or more parameters characterizing a state of a grand master clock. The first wireless transceiver device may then synchronize a first clock maintained at the first wireless transceiver device with a second clock maintained at the second wireless transceiver device based, at least in part, on the one or more parameters characterizing the state of the grand master clock and an expected difference in a first drift rate of the first clock and a second drift rate of the second clock. As discussed below, by synchronizing the first clock with the second clock, the first wireless transceiver device may enable coordinated operations between the first and second wireless transceiver devices to perform particular functions such as, for example, obtaining ranging measurements.

As discussed below, a first STA may transmit a timing measurement (TM) or fine timing measurement (FTM) request message to a second STA to initiate a process for an exchange of messages or frames enabling the second STA to synchronize a state of a clock to a state of a clock maintained by another device. It should be understood that this is merely an example implementation and that claimed subject matter is not limited in this respect.

According to an embodiment, as shown in FIG. 1, mobiles device 100a or 100b may transmit radio signals to, and receive radio signals from, a wireless communication network. In one example, a mobile device 100 may communicate with a communication network by transmitting wireless signals to, or receiving wireless signals from, a local transceiver 115 over a wireless communication link 125.

In a particular implementation, a local transceiver 115 may be positioned in an indoor environment. A local transceiver 115 may provide access to a wireless local area network (WLAN, e.g., IEEE Std. 802.11 network) or wireless personal area network (WPAN, e.g., Bluetooth network). In another example implementation, a local transceiver 115 may comprise a femto cell transceiver capable of facilitating communication on wireless communication link 125 according to a cellular communication protocol. Of course it should be understood that these are merely examples of networks that may communicate with a mobile device over a wireless link, and claimed subject matter is not limited in this respect.

In a particular implementation, local transceiver 115a or 115b may communicate with servers 140, 150 and/or 155 over a network 130 through links 145. Here, network 130 may comprise any combination of wired or wireless links. In a particular implementation, network 130 may comprise Internet Protocol (IP) infrastructure capable of facilitating communication between a mobile device 100 and servers 140, 150 or 155 through a local transceiver 115. In another implementation, network 130 may comprise wired or wireless communication network infrastructure to facilitate mobile cellular communication with mobile device 100.

In a particular implementation, mobile device 100 may be capable of computing a position fix based, at least in part, on signals acquired from local transmitters (e.g., WLAN access points positioned at known locations). For example, mobile devices may obtain a position fix by measuring ranges to three or more indoor terrestrial wireless access points which are positioned at known locations. Such ranges may be measured, for example, by obtaining a MAC ID address from signals received from such access points and obtaining range measurements to the access points by measuring one or more characteristics of signals received from such access points such as, for example, received signal strength (RSSI) or RTT. In alternative implementations, mobile device 100 may obtain an indoor position fix by applying characteristics of acquired signals to a radio heatmap indicating expected angle of arrival (AoA). In other alternative implementations, as pointed out above, mobile device 100 may obtain an indoor position fix by applying characteristics of acquired signals to a radio heatmap indicating expected TOF. Accordingly, a radio heatmap may comprising TOF, AoA, RSSI and/or RTT signatures at particular locations in an indoor area. In particular implementations, a radio heatmap may associate identities of local transmitters (e.g., a MAC address which is discernible from a signal acquired from a local transmitter), expected RSSI from signals transmitted by the identified local transmitters, an expected RTT from the identified transmitters, and possibly standard deviations from these expected AoA, TOF, RSSI or RTT. It should be understood, however, that these are merely examples of values that may be stored in a radio heatmap, and that claimed subject matter is not limited in this respect.

In a particular implementation, a mobile device 100 or local transceiver 115 may be capable of computing a position fix based, at least in part, on signals acquired from local transmitters (e.g., WLAN access points positioned at known locations). For example, a receiver device (e.g., a mobile device 100 or local transceiver 115) may obtain a position fix by measuring ranges to three or more indoor terrestrial wireless access points which are positioned at known locations. Such ranges may be measured, for example, by obtaining a MAC ID address from signals received from such access points and obtaining range measurements to the access points by measuring one or more characteristics of signals received from such access points such as, for example, received signal strength (RSSI) or RTT. In alternative implementations, a mobile device 100 may obtain an indoor position fix by applying characteristics of acquired signals to a radio heatmap indicating expected RSSI and/or RTT signatures at particular locations in an indoor area. In particular implementations, a radio heatmap may associate identities of local transmitters (e.g., a MAC address which is discernible from a signal acquired from a local transmitter), expected RSSI from signals transmitted by the identified local transmitters, an expected RTT from the identified transmitters, and possibly standard deviations from these expected RSSI or RTT. It should be understood, however, that these are merely examples of values that may be stored in a radio heatmap, and that claimed subject matter is not limited in this respect.

In particular implementations, a mobile device 100 or a local transceiver 115 may receive positioning assistance data for indoor positioning operations from servers 140, 150 or 155. For example, such positioning assistance data may include locations and identities of transmitters positioned at known locations to enable measuring ranges to these transmitters based, at least in part, on a measured RSSI and/or RTT, for example. Other positioning assistance data to aid indoor positioning operations may include radio heatmaps, magnetic heatmaps, locations and identities of transmitters, routeability graphs, just to name a few examples.

In a particular implementation, particular messages flows between wireless STAs may be implemented for obtaining a measurement of RTT from an exchange of messages between the STAs for use in positioning operations as discussed above. In particular implementations, as described below, any STA may comprise a mobile device (e.g., mobile device 100) or a stationary transceiver (e.g., IEEE std. 802.11 access point, stationary Bluetooth device, local transceiver 115, etc.). As such, an exchange of messages between wireless STAs may comprise an exchange of messages between a mobile device and a stationary transceiver (e.g., between a mobile device 100 and local transceiver 115 over a wireless link 125), between two peer mobile devices (e.g., between mobile devices 100a and 100b over wireless link 159), or between two stationary transceivers (e.g., between local transceiver 115a and local transceiver 115b over wireless link 179), just to provide a few examples. In particular implementations, various techniques described herein may incorporate some, but not necessarily all, aspects or features of IEEE P802.11-REVmc™/D4.0 Draft Standard 802.11 for Information technology—Telecommunications and information exchange between systems, Local and metropolitan area networks—Specific requirements Part 11: Wireless LAN Medium Access Control (MAC) and Physical Layer (PHY), January 2015, section 10.24.6 (hereinafter "IEEE P802.11-REVmc™/D4.0"). Indeed, it should be understood that some features described herein are not shown, described or taught in IEEE P802.11-REVmc™/D4.0. In other particular implementations, various techniques described herein may incorporate some, but not necessarily all, aspects or features of IEEE P802.1AS/D7.6 for Timing and Synchronization for Time-Sensitive Applications in Bridged Local Area Networks, Nov. 11, 2010 (hereinafter "IEEE P802.1AS/D7.6"). Indeed, it should be understood that some features described herein are not shown, described or taught in IEEE P802.1AS/D7.6.

Figure 2:
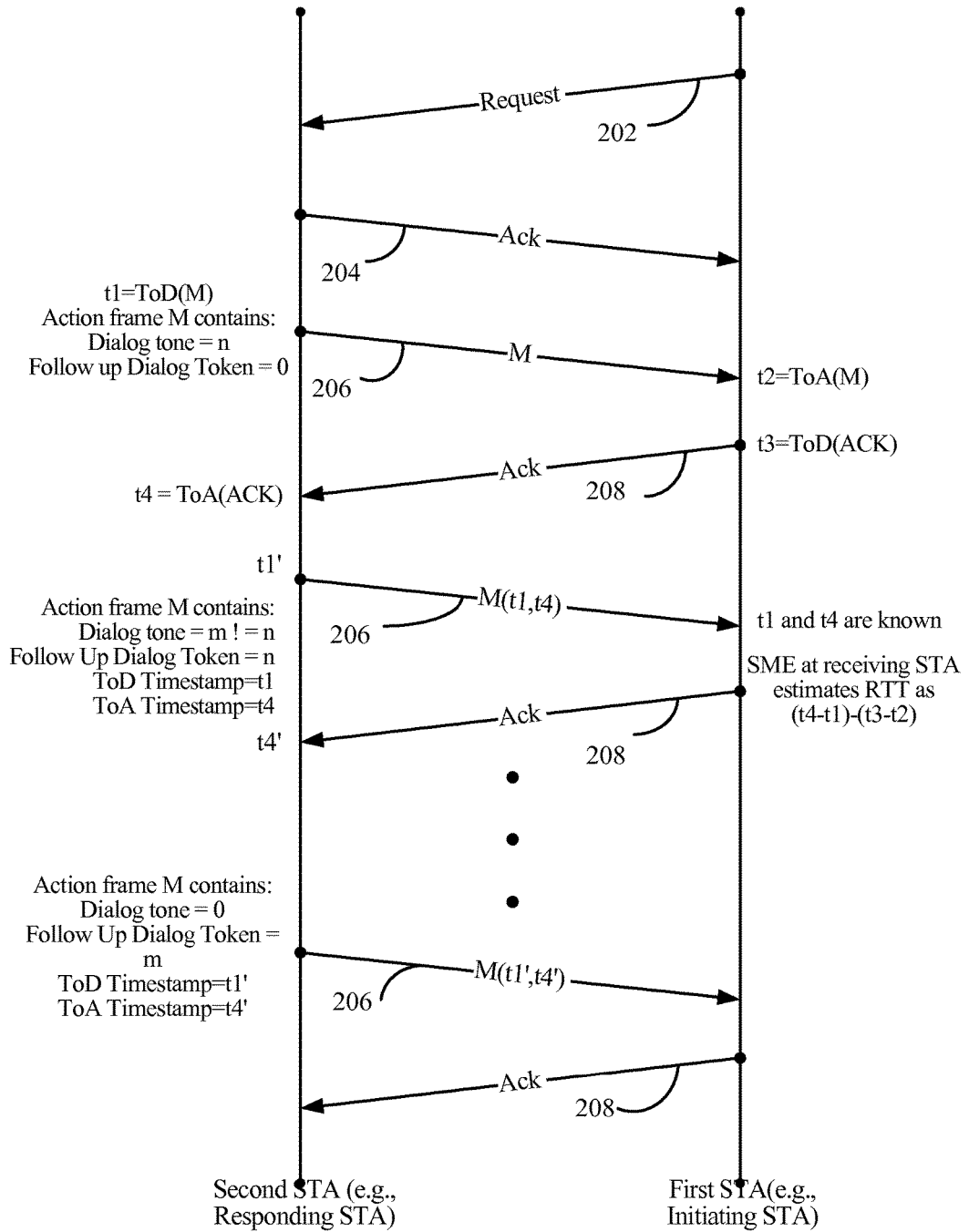
FIGS. 2 and 3 are diagrams illustrating message flows between wireless stations (STAs) according to particular embodiments.

FIG. 2 is a diagram illustrating a message flow between wireless stations STAs including a (first) "initiating" STA and a (second) "responding" STA according to an example embodiment. In this context, a responding STA or initiating STA may comprise any one of several transceiver devices including a mobile device (e.g., mobile device 100) or stationary access transceiver device (e.g., local transceiver 115). It should be understood, however, that these are merely examples of an initiating STA or a responding STA, and claimed subject matter is not limited in this respect. An initiating STA may obtain or compute one or more measurements of RTT based, at least in part, on timing of messages or frames transmitted between the initiating STA and a responding STA. As used herein, the terms "message" and "frame" are used interchangeably. The initiating STA may transmit a TM or FTM request message or frame ("Request") 202 to the responding STA and receive an acknowledgement message or frame ("Ack") 204 transmitted in response. In a particular implementation, while not limiting claimed subject matter in this respect, contents of such an FTM request message may be as shown in the IEEE P802.11-REVmc™/D4.0 at section 8.6.8.32. Similarly, while not limiting claimed subject matter in this respect, contents of such a TM message or TM request message may be as shown in IEEE P802.11-REVmc™/D4.0 at section 8.6.14.28. In particular implementations, such an Ack frame 204 may provide an indication of receipt of a previously transmitted message. The initiating STA may then obtain or compute an RTT measurement based, at least in part, on time stamp values (t1, t4) provided in TM or FTM messages or frames ("M") 206 received from the responding STA (and transmitted in response to receipt of a fine timing measurement request message). In a particular implementation, as shown in the message flow diagram, a sequence of multiple exchanges of alternating TM or FTM messages 206 followed by acknowledgement messages 208 may create additional time stamp values (t1, t2, t3 and t4).

According to an embodiment, a TM or FTM request message transmitted by an initiating STA may include fields, parameters, etc. characterizing a desired exchange of messages with a responding STA to provide TM or FTM measurements to the initiating STA enabling the initiating STA to compute a measurement (e.g., TOF or RTT). In response to receipt of a TM or FTM request message, a responding STA may transmit to the initiating STA one or more TM messages or FTM messages including measurements or parameters enabling the initiating STA to compute RTT, TOF or other parameters indicative of range.

In a particular implementation, while not limiting claimed subject matter in this respect, contents of such an FTM message or frame may be as shown in the IEEE P802.11-REVmc™/D4.0 at section 8.6.8.33. Similarly, contents of a TM message or frame may be as shown in IEEE P802.11-REVmc™/D4.0 at section 8.6.15.3. In one example implementation, an initiating STA may compute an RTT measurement as (t4−t1)−(t3−t2), where t2 and t3 are the time of receipt of a previous TM or FTM message or frame and transmission of a preceding acknowledgement message or frame, respectively. Similarly, with exactly the same set of frames, the initiating STA can compute a clock offset as ½*((t2−t1)−(t4−t3)). The initiating STA may transmit a single TM or FTM request message to obtain a corresponding number of RTT measurements which may be combined for cancellation of unbiased measurement noise in computing a range or offset between the receiving and responding STAs.

Figure 3:
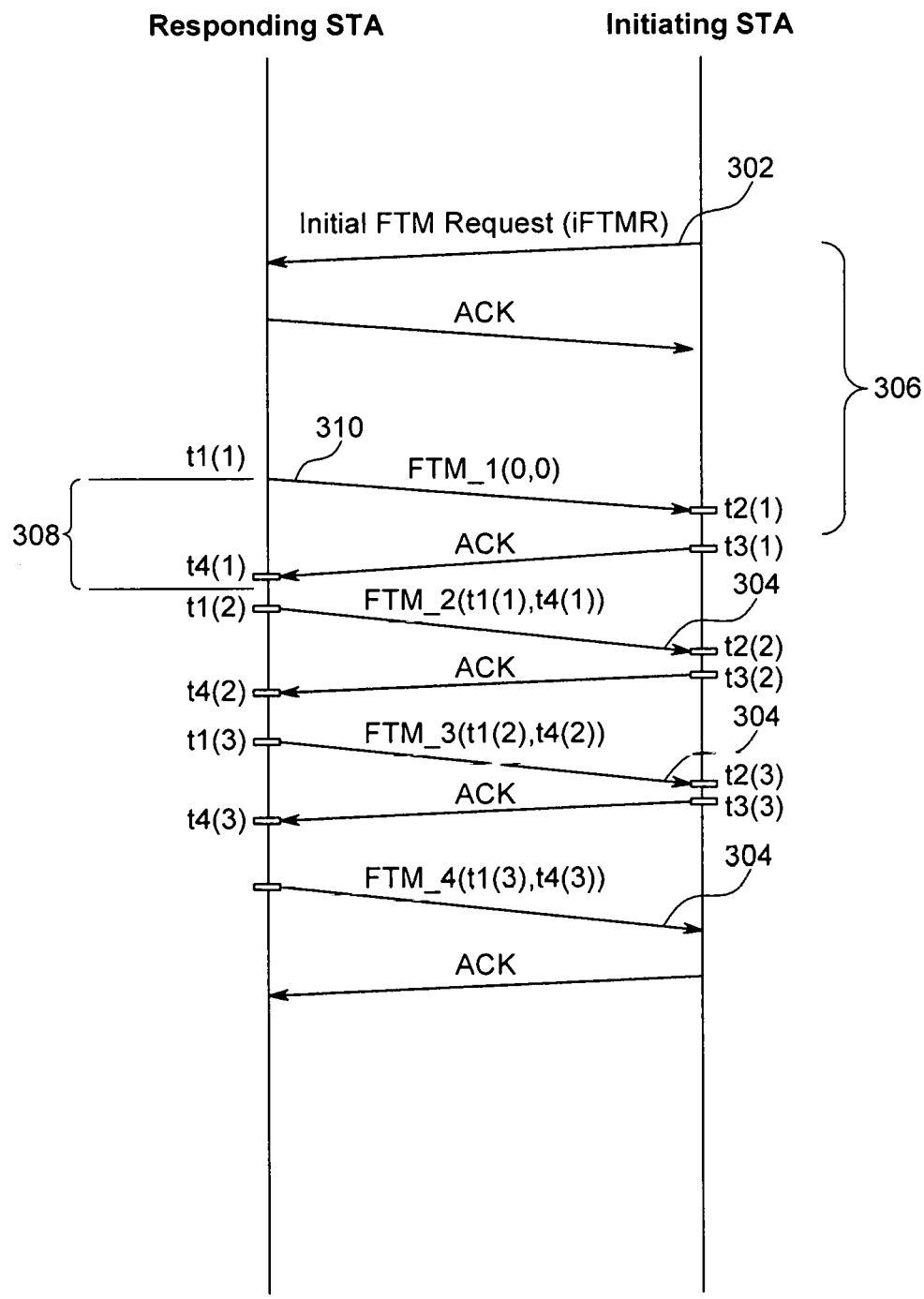

Computation of RTT or TOF as described above may not consider synchronization of clocks maintained at an initiating STA or a responding STA that may impact the accuracy of an RTT measurement based values for time stamps t1, t2, t3 and t4. Particular implementations as discussed below are directed to, among other things, computation of RTT or TOF based, at least in part, on expected clock drift at an initiating STA or responding STA. In one particular implementation, RTT may be computed based, at least in part, on an exchange of multiple messages between an initiating STA and a responding STA in a burst of messages as shown in FIG. 3. While the particular implementation of FIG. 3 shows use of FTM messages transmitted by a responding STA in response to a FTM request message transmitted by an initiating STA, other implementations may be directed to use of a burst of TM messages transmitted by a responding STA in response to a request from an initiating STA.

In the particular implementation of FIG. 3, an initiating STA may transmit an initial FTM request (FTMR) message 302 specifying, among other things, desired characteristics of a FTM messages to be transmitted by a responding STA in response to the initial FTMR message 302. Such desired characteristics may specify, for example, a minimum time 308 between transmissions of consecutive FTM messages in a burst of FTM messages or a maximum time 306 until receipt of an initial FTM message 304 in a requested burst of FTM messages, just to provide a few examples.

In a particular implementation, a clock maintained at an initiating STA or a responding STA may have a particular state that is advanced or incremented by a clock signal such as a signal oscillating according to a set clock frequency or period. In an example embodiment, a clock state may be represented a particular value or values (e.g., retrievable from a register). At any particular instance, the advanced or incremented state may represent an estimate of time for a particular time reference at the particular instance. While a first clock maintained at an initiating STA may be synchronized with a second clock maintained at a responding STA at a particular instance (e.g., such that the states of the first and second clocks mirror one another at the particular instance), over time states of the first and second clocks may deviate if the state of the first clock is advanced at a higher rate than the state of the second clock. This may occur, for example, if an oscillation frequency of a signal advancing the state of either the first or second clock (or both) deviates from a predetermined set frequency, allowing the advancing the state of either the first or second clock (or both) to "drift." In particular embodiments, an oscillation frequency of a clock signal may deviate from the set clock frequency because of, for example, manufacturing tolerances or temperature, just to provide a couple of examples. In this context, an amount of drift of a state of a clock maintained at an initiating STA may be quantified in units of parts per million and represented as $ppm_i$. Likewise, an amount of drift of a state of a clock maintained at a responding STA may be quantified in units parts per million and represented as $ppm_r$.

In particular applications, it may be desired to synchronize a state of a clock maintained at an initiating STA with a state of a clock maintained at a responding STA. This may be accomplished by, for example, determining a mapping between the state of the clock maintained at the initiating STA with the state of the clock maintained at the responding STA. In one implementation, such a mapping may be defined, at least in part, by an expected difference in a first drift of the first clock and a second drift of the second clock (e.g., expressed as $ppm_r - ppm_i$ in a particular implementation). Such a mapping may also be defined, at least in part, by a known offset value defining a known difference between states of the clocks maintained at the initiating and responding STAs at a particular instance in time.

According to a particular embodiment of the message flow of FIG. 3, an RTT measurement obtained by an initiating STA based on a burst of FTM messages may be expressed according to expression (1) as follows:

$$RTT = \frac{1}{FTMs \text{ per Burst} - 1} \sum_{k=1}^{FTMs\,per\,Burst-1} \frac{(t'_4(k) - t'_1(k))}{(1 + ppm_r)} - \frac{(t'_3(k) - t'_2(k))}{(1 + ppm_i)} \quad (1)$$

$$\approx \frac{(1 - ppm_r)}{FTMs \text{ per Burst} - 1} \sum_{k=1}^{FTMs\,per\,Burst-1} (t'_4(k) - t'_1(k)) -$$

$$(t'_3(k) - t'_2(k)) - \frac{1}{FTMs \text{ per Burst} - 1}$$

$$\sum_{k=1}^{FTMs\,per\,Burst-1} (t'_3(k) - t'_2(k))(ppm_r - ppm_i)$$

where:
$t_4'(k) = t_4(k)(1+ppm_r)$ for a kth FTM message in a burst of FTM messages;
$t_1'(k) = t_1(k)(1+ppm_r)$ for a kth FTM message in a burst of FTM messages;
$t_2'(k) = t_2(k)(1+ppm)$ for a kth FTM message in a burst of FTM messages;
$t_3'(k) = t_3(k)(1+ppm_i)$ for a kth FTM message in a burst of FTM messages;
$ppm_r$ is a drift associated with a responding STA clock; and
$ppm_i$ is a drift associated with an initiating STA clock.

It should be understood that RTT measurement obtained by an initiating STA based on a burst of received TM measurements may be similarly expressed according to expression (1) above.

Expression (1) above may be approximated based, at least in part, on a so-called "Neighbor Rate Ratio" computed according to a particular implementation as follows:

$$NeighborRateRatio = \frac{t_1(FTMs \text{ per Burst} - 1) - t_1(1)}{t_2(FTMs \text{ per Burst} - 1) - t_2(1)} = \quad (2)$$

$$\frac{1 + ppm_r}{1 + ppm_i} \approx (1 + ppm_r)(1 - ppm_i) \approx 1 + (ppm_r - ppm_i)$$

Accordingly, an expected difference between a first drift of a first clock maintained an initiating STA and a second drift of a second clock maintained at a responding STA may be approximated according to expression (3) as follows:

$$(ppm_r - ppm_i) = NeighborRateRatio - 1 \quad (3)$$

$$= \frac{t_1(FTMs \text{ per Burst} - 1) - t_1(1)}{t_2(FTMs \text{ per Burst} - 1) - t_2(1)} - 1.$$

As pointed out above, STAs in a communication network may locally maintain and advance clocks (e.g., based on an oscillating signal). According to an embodiment, for particular applications or operations (e.g., obtaining fine timing measurements for computing RTT or TOF) it may be beneficial to synchronize clocks maintained by different STAs. In one implementation, clocks maintained at different STAs in a network may be synchronized according to a state of a "grand master clock" compatible with IEEE 1588. Such a grand master clock may provide a reference by which clock states maintained at devices in a network (e.g., mobile devices 100a and 100b or local transceivers 115a and 115b). Parameters descriptive of a state of a grand master clock may include, for example, gmTimeBaseIndicator, lastGmPhase Change or scaledLastGmFreqChange as set forth in IEEE 1588 may be shared among STAs. In one particular implementation, parameters descriptive of a state of a grand master clock may be transmitted in an FTM message transmitted by a responding STA (e.g., in response to a FTM request messages from an initiating STA).

Figure 4:
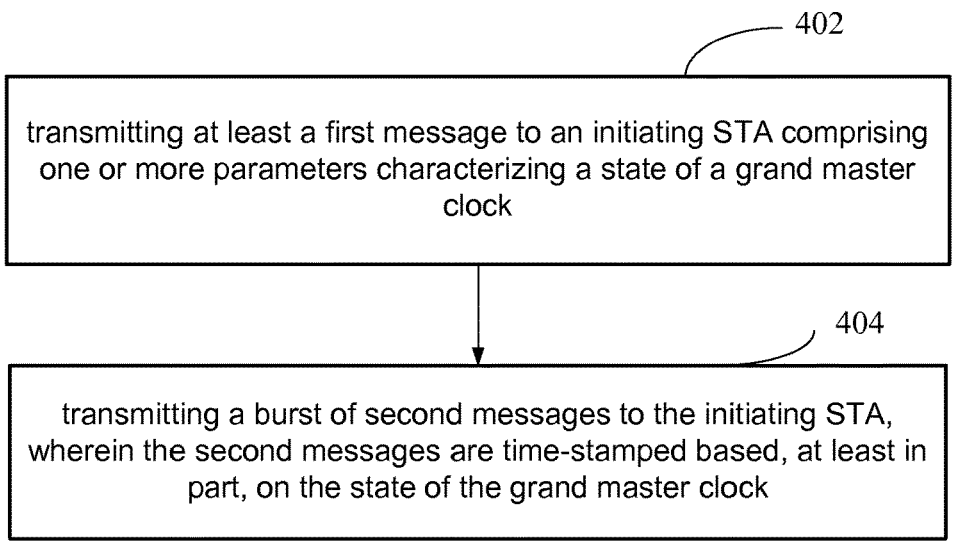
FIGS. 4 and 5 are flow diagrams of processes performed by STAs in connection with an exchange of messages according to particular embodiments.
Figure 5:
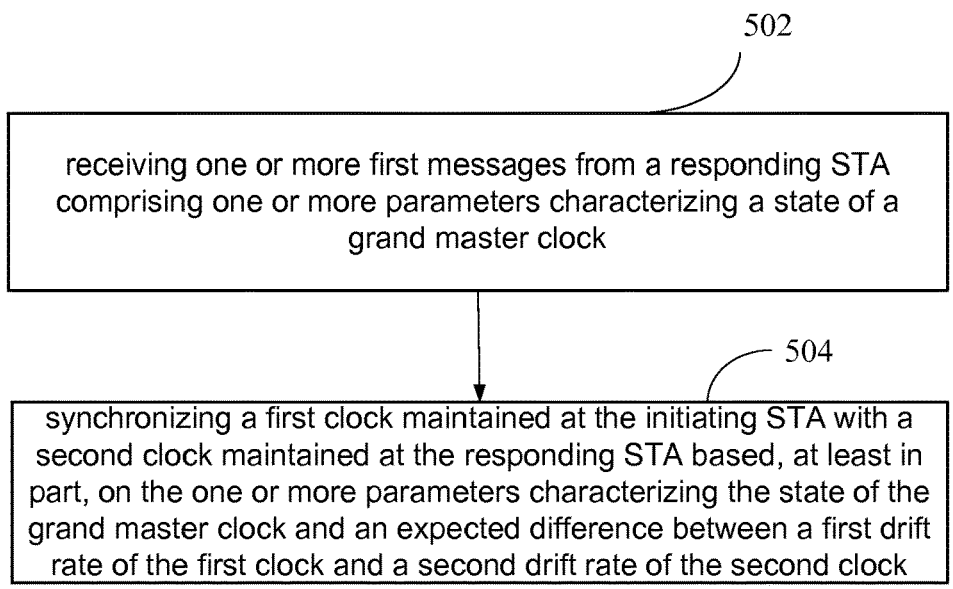

FIGS. 4 and 5 are flow diagrams of processes to be executed by wireless transceiver devices according to an embodiment. For example, in particular implementations, a process of FIG. 4 may be executed by a responding STA while a process of FIG. 5 may be executed by an initiating STA. At block 402, a responding STA may transmit a first message to an initiating STA comprising one or more parameters characterizing a state of a grand master clock. In a particular implementation, such a first message may comprise, for example, an initial FTM message (e.g., FTM message 310 shown in FIG. 3) transmitted in a burst of FTM messages in response to an initial FTMR message (e.g., Initial FTMR message 302 shown in FIG. 3). Here, such an initial FTM message may comprise parameters characterizing a state of a grand master clock as illustrated below with reference to FIG. 6, for example. In another implementation, such a first message may comprise an initial TM message transmitted in a burst of TM messages. Here, such an initial TM message may comprise parameters characterizing a state of a grand master clock as illustrated below with reference to FIG. 9, for example.

At block 404, a responding STA may transmit a burst of second messages (e.g., FTM messages 304) following transmission of an initial first message including time stamps (e.g., time stamps t1(k) and t4(k)). Here, time stamps provided in a message of the burst of second messages may be synchronized with or referenced to the state of the grand master clock. This may, for example, enable an accurate computation of RTT or TOF at the initiating STA.

At block 502 of the process of FIG. 5, a wireless transceiver device such as an initiating STA may receive one or more first messages from a responding STA (e.g., first message transmitted at block 402 above). The one or more first message may comprise one or more parameters characterizing a state of a grand master clock as discussed below with reference to FIG. 6 for the one or more first messages comprising an FTM message and with reference to FIG. 7 for the one or more first messages comprising a TM message.

At block 504, an initiating STA may synchronize a state of a first clock maintained at the initiating STA with a state of a second clock maintained at the responding STA based, at least in part, on the state of the grand master clock as characterized by parameters in the first message, and an expected difference in a drift of the first clock and a drift of the second clock. The expected difference in the drift of the first clock and the drift of the second clock may be computed according to expression (3) (e.g., based on times of arrival of and time stamps provided in FTM messages 304).

As illustrated in FIG. 6, parameters descriptive of a state of a grand master clock including, for example, the aforementioned parameters gmTimeBaseIndicator, lastGmPhaseChange or scaledLastGmFreqChange, which may be provided as part of an initial FTM message (e.g., FTM message 310 of FIG. 3) transmitted in response to an FTM request message. The parameter scaledLastGmFreqChange, for example, may represent a fractional frequency offset of a current state of a grand master clock relative to a previous state. The value lastGmPhaseChange may represent a time of a current state of a grand master clock minus a time of a previous grand master clock state at the time that the current grandmaster clock became the grandmaster clock. The value gmTimeBaseIndicator may represent a ClockSource entity of a current grand master clock. An initial FTM message providing parameters descriptive of a state of a grand master clock may further comprise a field appended to an optional Fine Timing Measurement Parameters field and labelled as "vendor proprietary containing FollowUpInformation" characterizing a state of a grand master clock. In particular implementations, this field may be omitted in FTM messages other than an initial FTM message of a burst of FTM messages. In an alternative implementation, such a field may be similarly appended to a TM message as "Vendor proprietary containing FollowUpInformation" as illustrated in FIG. 9. Again, this field may be omitted in TM messages other than an initial TM message of a burst of TM messages. It should be understood, however, that this is merely an example of how parameters descriptive of a state of a grand master clock may be transmitted in a message, and claimed subject matter is not limited in this respect.

In a particular implementation, "Vendor proprietary containing FollowUpInformation" as illustrated in the alternative implementations of FIGS. 6 and 9 may be formatted according to FIG. 12 which includes a header portion and Follow_Up information. The header portion may be implemented as shown in FIG. 13. Follow_Up information may be formatted according to FIG. 14 to include parameters indicative of a state of a grand master clock as discussed above.

According to an embodiment, a STA may be capable of either exchanging FTM request messages and FTM request messages or exchanging TM request messages and TM messages. In a particular example, an initiating STA may request or indicate to a responding STA a capability or preference for either TM messages (e.g., with a time stamp resolution of 10.0 ns) or FTM messages (e.g., with a time stamp resolution of 0.1 ns). In particular implementations, an initiating STA may indicate a preference or capability for a TM messages or FTM messages in either an initial FTM request message or an initial TM request message (e.g., initial FTMR message 302). In the example fields of a FTM request message shown in FIG. 7, for example, reserved bits of a "Trigger" field may indicate an ability or a preference for TM or FTM measurements to satisfy the FTM request message.

In an alternative implementation, an initiating STA may specify a capability or preference for TM messages or FTM messages in a TM request message. In the example fields of a TM request message shown in FIG. 8, for example, reserved bits of a "Trigger" field may be used to indicate an ability or a preference for TM or FTM messages to satisfy the TM request message. Alternatively, an initiating STA may specify a preference for TM or FTM messages to satisfy a TM request message by a presence or absence of particular FTM parameters in the TM request message. As shown in FIG. 8, FTM parameters may be provided in an optional field appended to a Trigger field in a TM request message.

According to another particular embodiment, a STA may provide its location (e.g., latitude and longitude coordinates) to another STA in either a TM request message or a TM message. Here, a STA may provide parameters indicative of its location in an optional field appended to a Trigger field in a TM request message as shown in FIG. 8 or an optional field appended to a Max TOA Error field of a TM message as shown in FIG. 9. Exchange of latitude and longitude may support emergency 911 operations, for example.

Figure 10:
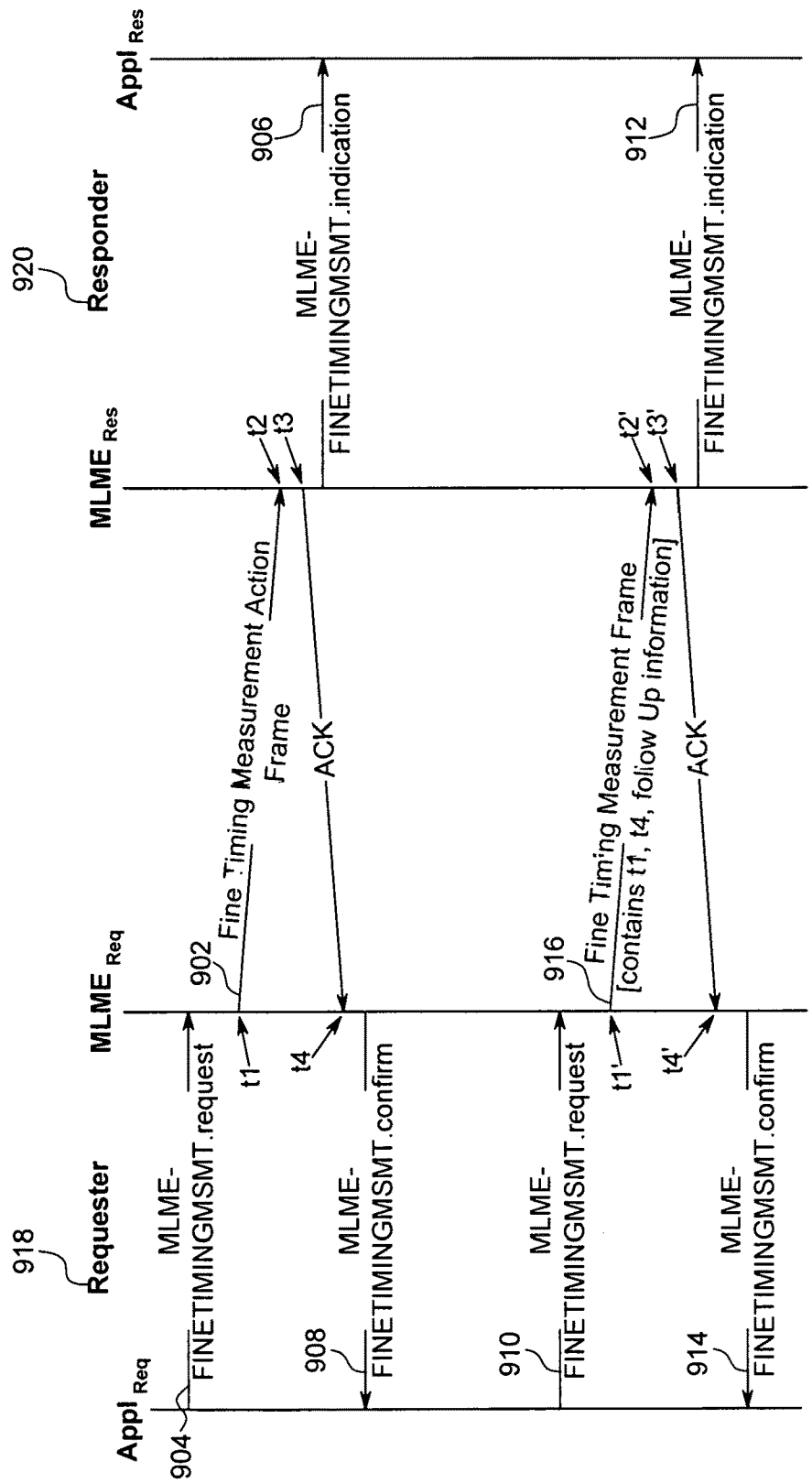
FIG. 10 is a message flow diagram illustrating exchanges of messages including fine timing measurement (FTM) messages between or among device according to an embodiment.
Figure 11:
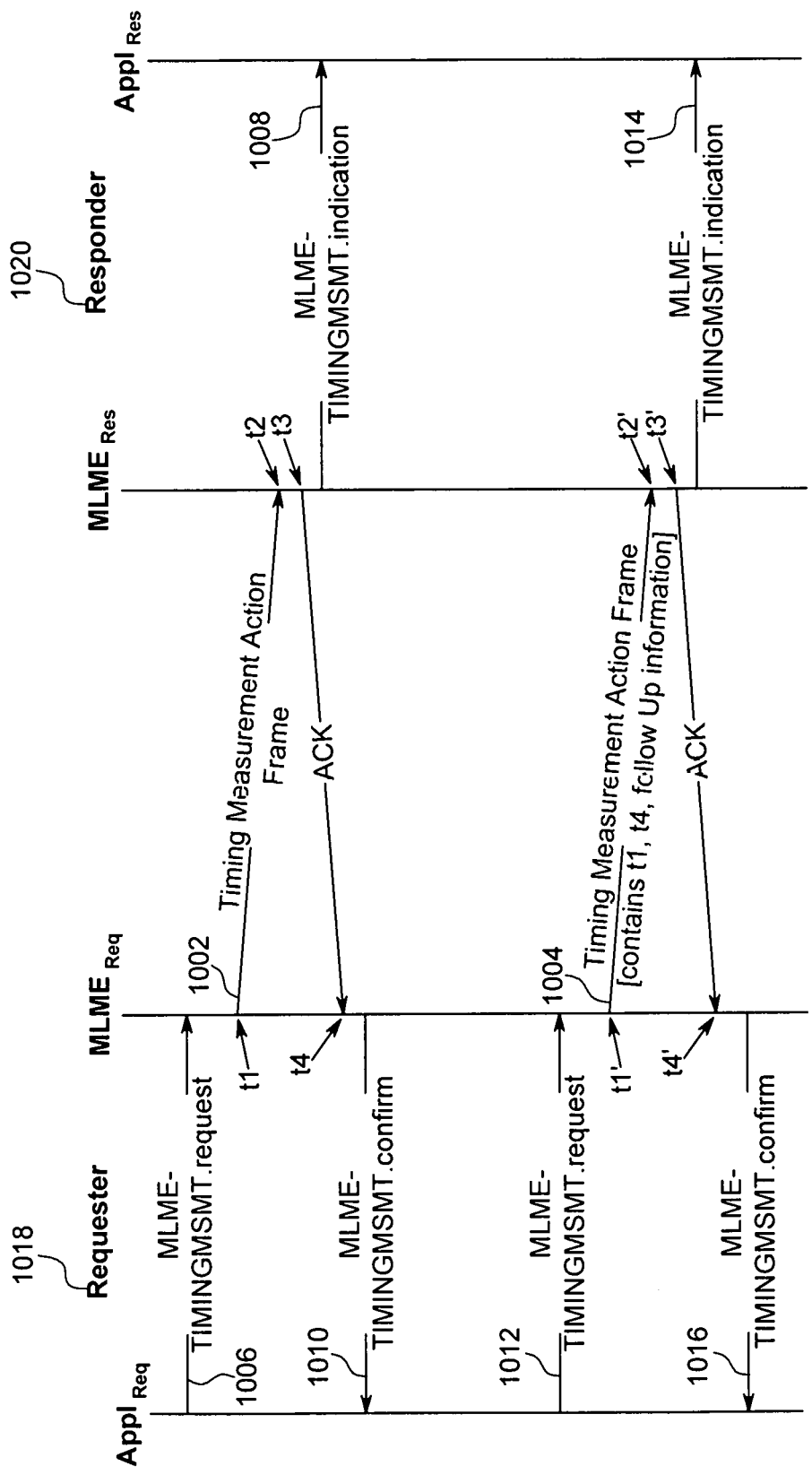
FIG. 11 is a message flow diagram illustrating exchanges of messages including timing measurement (TM) messages between or among device according to an embodiment.

FIGS. 10 and 11 are message flow diagrams of illustrating interaction between or among applications, MAC sublayer entities (MLMEs) of requester and responder devices, according to particular implementations. Here, requester and responder devices may comprise respective clocks having clock states as discussed above. In the particular embodiment of FIG. 10, a (initiating) requester device 918 comprising a first wireless transceiver device may transmit an FTM action frame 902 to a (responding) responder device 920 comprising a second wireless transceiver device. For example, with the requester device 918 or the responder device 920 may comprise a mobile device 100 or local transceiver device 115 as shown in FIG. 1. The requester device 918 comprises an MLME $MLME_{Req}$ and the responder device 920 comprises an MLME $MLME_{Res}$. An application $Appl_{Req}$ hosted at the requester device 918 may provide a signal 904 to MLME $MLME_{Req}$ to initiate transmission of FTM action frame 902. In response to receipt of FTM action frame 902, $MLME_{Res}$ may provide signal 906 to an application $Appl_{Res}$ hosted at the responder device 920. Signal 906 may alert application $Appl_{Res}$ that the requester device 918 may attempt to provide a subsequent message enabling the responder device 920 to synchronize a clock state maintained at the responder device 920 with a clock state maintained at the requester device 918. Responsive to receipt of an acknowledgement message at MLME $MLME_{Req}$, signal 908 may then report to application $Appl_{Req}$ that the receipt of FTM action frame 902 has been acknowledged. The requester device 918 may then generate signal 910 to initiate transmission of a FTM frame 916. Here, FTM frame 916 may include, among other things, values for time stamps t1 and t4 which may be used for computing measurements for RTT or TOF as discussed above. In addition, FTM frame 916 may also comprise parameters indicative of a state of a grand master clock such as followUp information in a field. In one embodiment, the Request device may then transmit one or more bursts of FTM messages to enable the Responder device to account for drift in synchronizing its clock. Alternatively, the Requester device may transmit one or more FTM frames to enable the Responder device to estimate drift. This may enable the responder device 920 to synchronize its clock state with the clock state maintained at the requester device 918 as discussed above.

In a particular implementation, following synchronization of its clock state with that of the requester device 918, the responder device 920 may transmit one or more FTM action frames to other devices (not shown) to enable these other devices to synchronize states of clocks maintained at the other devices. For example, following synchronization of its clock state with that of the requester device 918, responder device 920 of the process of FIG. 10 may act as a requesting device by transmitting FTM messages comprising synchronized time stamps (e.g., t1 and t4) and parameters characterizing a state of a grand master clock. In one particular example, requester device 918 and responder device 920 may comprise wireless audio speaker devices in a system of wireless audio speaker devices that are to synchronize the playing of audio content. Responder device 920 may transmit FTM frames to one or more additional wireless audio speaker devices in the system of wireless audio speaker devices.

The particular implementation of FIG. 11 illustrates that the example process illustrated in FIG. 10 may be implemented using transmission of TM action frames (e.g., TM action frame 1002 in lieu of FTM action frame 902 shown in FIG. 10), and TM frames (e.g., TM frames 1004 in lieu of FTM frames 916). In the particular embodiment of FIG. 11, a (initiating) requester device 1018 comprising a first wireless transceiver device may transmit an TM action frame 1002 to a (responding) responder device 1020 comprising a second wireless transceiver device. For example, with the requester device 1018 or the responder device 1020 may comprise a mobile device 100 or local transceiver device 115 as shown in FIG. 1. The requester device 1018 comprises an MLME $MLME_{Req}$ and the responder device 1020 comprises an MLME $MLME_{Res}$. An application $Appl_{Req}$ hosted at the requester device 1018 may provide a signal 1004 to MLME $MLME_{Req}$ to initiate transmission of TM action frame 1002. In response to receipt of TM action frame 1002, $MLME_{Res}$ may provide signal 1008 to an application $Appl_{Res}$ hosted at the responder device 1020. Signal 1008 may alert application $Appl_{Res}$ that the requester device 1018 may attempt to provide a subsequent message enabling the responder device 1020 to synchronize a clock state maintained at the responder device 1020 with a clock state maintained at the requester device 1018. Responsive to receipt of an acknowledgement message at MLME $MLME_{Req}$, signal 1010 may then report to application $Appl_{Res}$ that the receipt of TM action frame 1002 has been acknowledged. The requester device 1018 may then generate signal 1012 to initiate transmission of a TM frame 1004. Here, TM frame 1004 may include, among other things, values for time stamps t1 and t4 which may be used for computing measurements for RTT or TOF as discussed above. In addition, TM frame 1004 may also comprise parameters indicative of a state of a grand master clock such as followUp information in a field. In one embodiment, the Request device may then transmit one or more bursts of TM messages to enable the Responder device to account for drift in synchronizing its clock. Alternatively, the Requester device may transmit one or more TM frames to enable the Responder device to estimate drift. This may enable the responder device 1020 to synchronize its clock state with the clock state maintained at the requester device 1018 as discussed above.

In a particular implementation, following synchronization of its clock state with that of the requester device 1018, the responder device 1020 may transmit one or more TM action frames to other devices (not shown) to enable these other devices to synchronize states of clocks maintained at the other devices. For example, following synchronization of its clock state with that of the requester device 1018, responder device 1020 of the process of FIG. 11 may act as a requesting device by transmitting TM messages comprising synchronized time stamps (e.g., t1 and t4) and parameters characterizing a state of a grand master clock. In one particular example, requester device 1018 and responder device 1020 may comprise wireless audio speaker devices in a system of wireless audio speaker devices that are to synchronize the playing of audio content. Responder device 1020 may transmit FTM frames to one or more additional wireless audio speaker devices in the system of wireless audio speaker devices.

Figure 15:
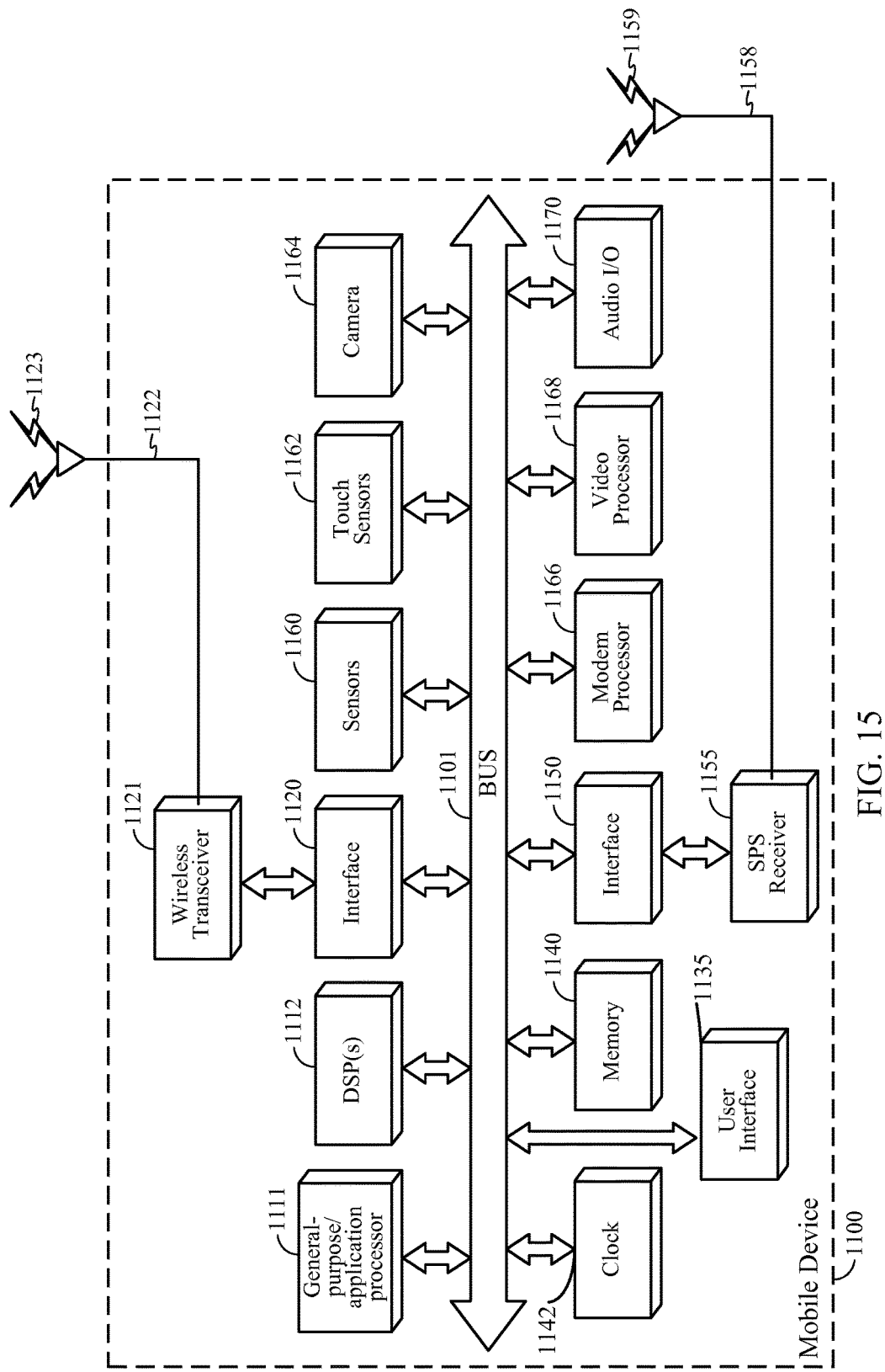
FIG. 15 is a schematic block diagram illustrating an exemplary device, in accordance with an implementation.

FIG. 15 is a schematic diagram of a mobile device according to an embodiment. Mobile device 100 (FIG. 1) may comprise one or more features of mobile device 1100 shown in FIG. 15. In certain embodiments, mobile device 1100 may also comprise a wireless transceiver 1121 which is capable of transmitting and receiving wireless signals 1123 via wireless antenna 1122 over a wireless communication network. Wireless transceiver 1121 may be connected to bus 1101 by a wireless transceiver bus interface 1120. Wireless transceiver bus interface 1120 may, in some embodiments be at least partially integrated with wireless transceiver 1121. Some embodiments may include multiple wireless transceivers 1121 and wireless antennas 1122 to enable transmitting and/or receiving signals according to a corresponding multiple wireless communication standards such as, for example, versions of IEEE Std. 802.11, CDMA, WCDMA, LTE, UMTS, GSM, AMPS, Zigbee and Bluetooth, just to name a few examples.

Mobile device 1100 may further comprise a clock 1142 comprising circuitry, registers, memory, etc. that is capable of advancing and maintaining a clock state. In a particular implementation, a clock state may be advanced by incrementing a counter or other value on set increment cycles (e.g., in response to an oscillating signal). In particular implementations, clock 1142 may comprise registers, oscillators, input terminals output terminals, etc. capable of providing values indicative of a clock state. In particular embodiments, a clock state maintained at clock 1142 may be used to control processes to execute application functions on in a coordinated fashion on general purpose/application processor 1111, DSP(s) 1112, etc. As pointed out above, a clock state maintained at clock 1142 may be synchronized with clock states maintained by devices other than mobile device 1100.

Mobile device 1100 may also comprise SPS receiver 1155 capable of receiving and acquiring SPS signals 1159 via SPS antenna 1158. SPS receiver 1155 may also process, in whole or in part, acquired SPS signals 1159 for estimating a location of mobile device 1000. In some embodiments, general-purpose processor(s) 1111, memory 1140, DSP(s) 1112 and/or specialized processors (not shown) may also be utilized to process acquired SPS signals, in whole or in part, and/or calculate an estimated location of mobile device 1100, in conjunction with SPS receiver 1155. Storage of SPS or other signals for use in performing positioning operations may be performed in memory 1140 or registers (not shown).

Also shown in FIG. 15, mobile device 1100 may comprise digital signal processor(s) (DSP(s)) 1112 connected to the bus 1101 by a bus interface 1110, general-purpose processor(s) 1111 connected to the bus 1101 by a bus interface 1110 and memory 1140. Bus interface 1110 may be integrated with the DSP(s) 1112, general-purpose processor(s) 1111 and memory 1140. In various embodiments, functions may be performed in response execution of one or more machine-readable instructions stored in memory 1140 such as on a computer-readable storage medium, such as RAM, ROM, FLASH, or disc drive, just to name a few example. The one or more instructions may be executable by general-purpose processor(s) 1111, specialized processors, or DSP(s) 1112. Memory 1140 may comprise a non-transitory processor-readable memory and/or a computer-readable memory that stores software code (programming code, instructions, etc.) that are executable by processor(s) 1111 and/or DSP(s) 1112 to perform functions described herein. In a particular implementation, wireless transceiver 1121 may communicate with general-purpose processor(s) 1111 and/or DSP(s) 1112 through bus 1101 to enable mobile device 1100 to be configured as a wireless STA as discussed above. General-purpose processor(s) 1111 and/or DSP(s) 1112 may execute instructions to execute one or more aspects of processes discussed above in connection with FIGS. 3, 4, 5, 10 and 11.

Also shown in FIG. 15, a user interface 1135 may comprise any one of several devices such as, for example, a speaker, microphone, display device, vibration device, keyboard, touch screen, just to name a few examples. In a particular implementation, user interface 1135 may enable a user to interact with one or more applications hosted on mobile device 1100. For example, devices of user interface 1135 may store analog or digital signals on memory 1140 to be further processed by DSP(s) 1112 or general purpose/application processor 1111 in response to action from a user. Similarly, applications hosted on mobile device 1100 may store analog or digital signals on memory 1140 to present an output signal to a user. In another implementation, mobile device 1100 may optionally include a dedicated audio input/output (I/O) device 1170 comprising, for example, a dedicated speaker, microphone, digital to analog circuitry, analog to digital circuitry, amplifiers and/or gain control. It should be understood, however, that this is merely an example of how an audio I/O may be implemented in a mobile device, and that claimed subject matter is not limited in this respect. In another implementation, mobile device 1100 may comprise touch sensors 1162 responsive to touching or pressure on a keyboard or touch screen device.

Mobile device 1100 may also comprise a dedicated camera device 1164 for capturing still or moving imagery. Dedicated camera device 1164 may comprise, for example an imaging sensor (e.g., charge coupled device or CMOS imager), lens, analog to digital circuitry, frame buffers, just to name a few examples. In one implementation, additional processing, conditioning, encoding or compression of signals representing captured images may be performed at general purpose/application processor 1111 or DSP(s) 1112. Alternatively, a dedicated video processor 1168 may perform conditioning, encoding, compression or manipulation of signals representing captured images. Additionally, dedicated video processor 1168 may decode/decompress stored image data for presentation on a display device (not shown) on mobile device 1100.

Mobile device 1100 may also comprise sensors 1160 coupled to bus 1101 which may include, for example, inertial sensors and environment sensors. Inertial sensors of sensors 1160 may comprise, for example accelerometers (e.g., collectively responding to acceleration of mobile device 1100 in three dimensions), one or more gyroscopes or one or more magnetometers (e.g., to support one or more compass applications). Environment sensors of mobile device 1100 may comprise, for example, temperature sensors, barometric pressure sensors, ambient light sensors, camera imagers, microphones, just to name few examples. Sensors 1160 may generate analog or digital signals that may be stored in memory 1140 and processed by DPS(s) or general purpose/application processor 1111 in support of one or more applications such as, for example, applications directed to positioning or navigation operations.

In a particular implementation, mobile device 1100 may comprise a dedicated modem processor 1166 capable of performing baseband processing of signals received and downconverted at wireless transceiver 1121 or SPS receiver 1155. Similarly, dedicated modem processor 1166 may perform baseband processing of signals to be upconverted for transmission by wireless transceiver 1121. In alternative implementations, instead of having a dedicated modem processor, baseband processing may be performed by a general purpose processor or DSP (e.g., general purpose/application processor 1111 or DSP(s) 1112). It should be understood, however, that these are merely examples of structures that may perform baseband processing, and that claimed subject matter is not limited in this respect.

Figure 16:
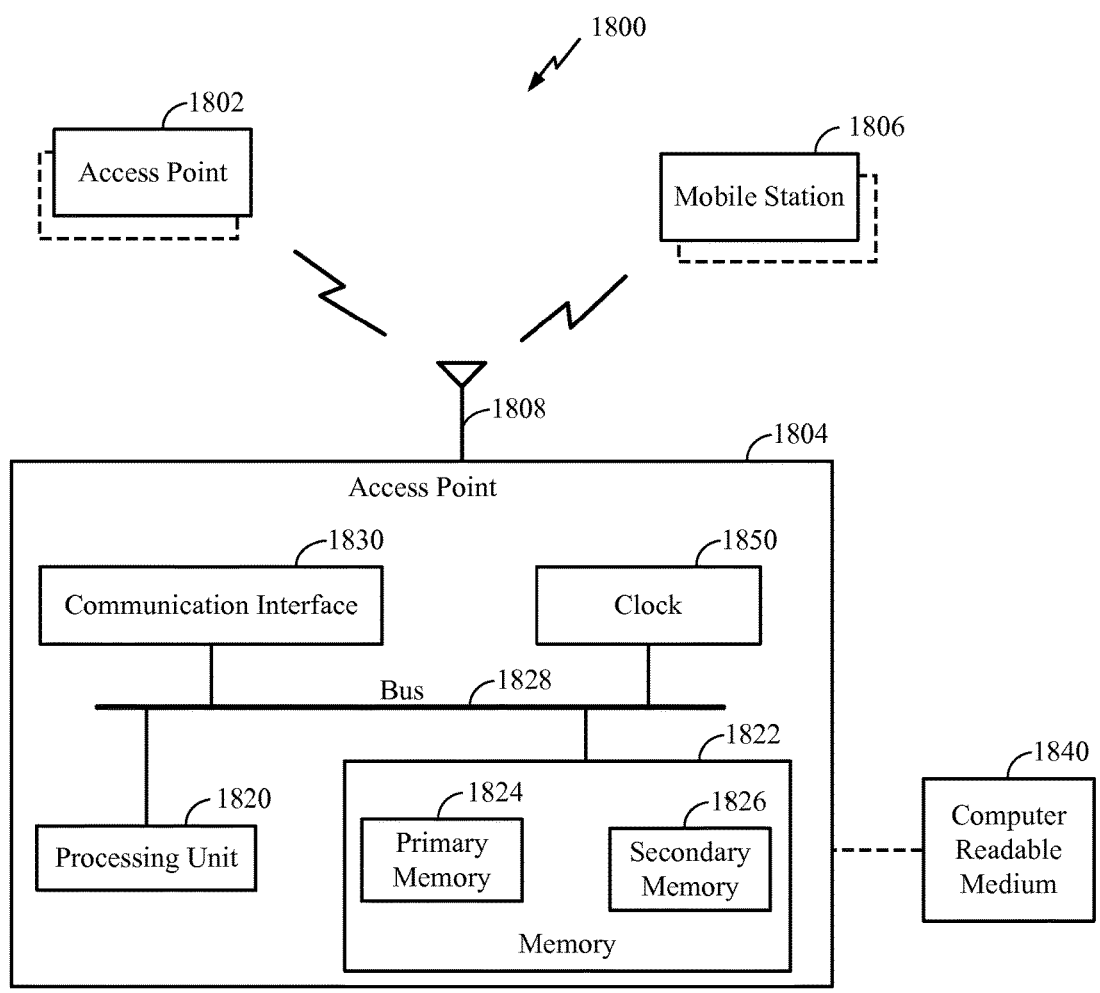
FIG. 16 is a schematic block diagram of an example computing system in accordance with an implementation.

FIG. 16 is a schematic diagram illustrating an example system 1800 that may include one or more devices configurable to implement techniques or processes described above, for example, in connection with FIG. 1. System 1800 may include, for example, a first device 1802, a second device 1804, and a third device 1806, which may be operatively coupled together through a wireless communications network. In an aspect, first device 1802 may comprise an access point as shown, for example. Second device 1804 may comprise an access point (e.g., local transceiver 115 or base station transceiver 110) and third device 1806 may comprise a mobile station or mobile device, in an aspect. Also, in an aspect, devices 1802, 1804 and 1802 may be included in a wireless communications network may comprise one or more wireless access points, for example. However, claimed subject matter is not limited in scope in these respects.

First device 1802, second device 1804 and third device 1806, as shown in FIG. 16, may be representative of any device, appliance or machine that may be configurable to exchange data over a wireless communications network. By way of example but not limitation, any of first device 1802, second device 1804, or third device 1806 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or data storage service provider/system, a network service provider/system, an Internet or intranet service provider/system, a portal or search engine service provider/system, a wireless communication service provider/system; or any combination thereof. Any of the first, second, and third devices 1802, 1804, and 1806, respectively, may comprise one or more of an access point or a mobile device in accordance with the examples described herein.

Similarly, a wireless communications network, as shown in FIG. 16, is representative of one or more communication links, processes, or resources configurable to support the exchange of data between at least two of first device 1802, second device 1804, and third device 1806. By way of example but not limitation, a wireless communications network may include wireless or wired communication links, telephone or telecommunications systems, data buses or channels, optical fibers, terrestrial or space vehicle resources, local area networks, wide area networks, intranets, the Internet, routers or switches, and the like, or any combination thereof. As illustrated, for example, by the dashed lined box illustrated as being partially obscured of third device 1806, there may be additional like devices operatively coupled to wireless communications network 1808.

It is recognized that all or part of the various devices and networks shown in FIG. 16, and the processes and methods as further described herein, may be implemented using or otherwise including hardware, firmware, software, or any combination thereof.

Thus, by way of example but not limitation, second device 1804 may include at least one processing unit 1820 that is operatively coupled to a memory 1822 through a bus 1828.

Processing unit 1820 is representative of one or more circuits configurable to perform at least a portion of a data computing procedure or process. By way of example but not limitation, processing unit 1820 may include one or more processors, controllers, microprocessors, microcontrollers, application specific integrated circuits, digital signal processors, programmable logic devices, field programmable gate arrays, and the like, or any combination thereof.

Memory 1822 is representative of any data storage mechanism. Memory 1822 may include, for example, a primary memory 1824 or a secondary memory 1826. Primary memory 1824 may include, for example, a random access memory, read only memory, etc. While illustrated in this example as being separate from processing unit 1820, it should be understood that all or part of primary memory 1824 may be provided within or otherwise co-located/coupled with processing unit 1820. In a particular implementation, memory 1822 and processing unit 1820 may be configured to execute one or more aspects of process discussed above in connection with FIGS. 3, 4, 5 10 and 11.

Secondary memory 1826 may include, for example, the same or similar type of memory as primary memory or one or more data storage devices or systems, such as, for example, a disk drive, an optical disc drive, a tape drive, a solid state memory drive, etc. In certain implementations, secondary memory 1826 may be operatively receptive of, or otherwise configurable to couple to, a computer-readable medium 1840. Computer-readable medium 1840 may include, for example, any non-transitory medium that can carry or make accessible data, code or instructions for one or more of the devices in system 1800. Computer-readable medium 1840 may also be referred to as a storage medium.

Second device 1804 may further comprise a clock 1850 comprising circuitry, registers, memory, etc. that is capable of advancing and maintaining a clock state. In a particular implementation, a clock state may be advanced by incrementing a counter or other value on set increment cycles (e.g., in response to an oscillating signal). In particular implementations, clock 1805 may comprise registers, oscillators, input terminals output terminals, etc. capable of providing values indicative of a clock state. In particular embodiments, a clock state maintained at clock 1850 may be used to control processes to execute application functions on in a coordinated fashion on general purpose/application processor 1111, DSP(s) 1112, etc. As pointed out above, a clock state maintained at clock 1850 may be synchronized with clock states maintained by devices other than second device 1804 (e.g., first device 1802 and third device 1806).

Second device 1804 may include, for example, a communication interface 1830 that provides for or otherwise supports the operative coupling of second device 1804 to a wireless communications network at least through an antenna 1808. By way of example but not limitation, communication interface 1830 may include a network interface device or card, a modem, a router, a switch, a transceiver, and the like. In other alternative implementations, communication interface 1830 may comprise a wired/LAN interface, wireless LAN interface (e.g., IEEE std. 802.11 wireless interface) and/or a wide area network (WAN) air interface. In a particular implementation, antenna 1808 in combination with communication interface 1830 may be used to implement transmission and reception of signals as illustrated in FIGS. 3, 4, 5, 10 and 11.

In one particular implementation, transmission of an ACK message in response to a FTM measurement request message may be performed at communication interface 1830 without instruction or initiation from processing unit 1830. On the other hand, an FTM range report message may be formed at a programmable device such as processing unit 1820 (e.g., from execution of one or more machine-readable instructions stored in memory 1820).

Second device 1804 may include, for example, an input/output device 1832. Input/output device 1832 is representative of one or more devices or features that may be configurable to accept or otherwise introduce human or machine inputs, or one or more devices or features that may be configurable to deliver or otherwise provide for human or machine outputs. By way of example but not limitation, input/output device 1832 may include an operatively configured display, speaker, keyboard, mouse, trackball, touch screen, data port, etc.

In addition to, or alternative to, the subject matter initially claimed herein, the following examples present, with non-limiting intent, some subject matter that may be of interest in the present patent application or possibly one or more continuation patent applications or divisional patent applications. In one embodiment, a method, at a responding STA, comprises transmitting at least one first message to an initiating STA comprising one or more parameters characterizing a state of a grand master clock; and transmitting a burst of second messages to the initiating STA, wherein the second messages are time-stamped based, at least in part, on the state of the grand master clock. In one alternative implementation, transmitting the at least first message further comprises transmitting the at least one first message in response to receipt of a fine timing measurement (FTM) request message. In another alternative implementation, the FTM request message comprises one or more fields indicating an ability or preference for FTM messages or timing measurement messages as the one or more second messages. In yet another alternative implementation, the one or more parameters characterizing the state of the grand master clock comprise gmTimeBaseIndicator, lastGmPhase Change or scaledLastGmFreqChange, or a combination thereof.

In another embodiment, responding STA comprises a wireless transceiver to transmit messages to and receive messages from a wireless communication network; and one or more processors configured to: initiate transmission of at least one first message through the transceiver to an initiating STA comprising one or more parameters characterizing a state of a grand master clock; and initiate transmission of a burst of second messages through the transceiver to the initiating STA, wherein the second messages are time-stamped based, at least in part, on the state of the grand master clock. In one alternative implementation, the one or more processors are further configured to initiate transmission of the at least one first message in response to receipt of a fine timing measurement (FTM) request message. In another alternative implementation, the FTM request message comprises one or more fields indicating an ability or preference for FTM messages or timing measurement messages as the one or more second messages. In another alternative, the one or more parameters characterizing the state of the grand master clock comprise gmTimeBaseIndicator, lastGmPhase Change or scaledLastGmFreqChange, or a combination thereof.

In another embodiment, a responding wireless station (STA) may comprise: means for transmitting at least one first message to an initiating STA comprising one or more parameters characterizing a state of a grand master clock; and means for transmitting a burst of second messages to the initiating STA, wherein the second messages are time-stamped based, at least in part, on the state of the grand master clock. In one alternative implementation, the means for transmitting the at least first message further comprises means for transmitting the at least one first message in response to receipt of a fine timing measurement (FTM) request message. In another alternative implementation, the FTM request message comprises one or more fields indicating an ability or preference for FTM messages or timing measurement messages as the one or more second messages. In another alternative implementation, the one or more parameters characterizing the state of the grand master clock comprise gmTimeBaseIndicator, lastGmPhase Change or scaledLastGmFreqChange, or a combination thereof.

In another alternative embodiment, a non-transitory storage medium comprises computer readable instructions stored thereon which are executable by a processor of a responding wireless station (STA) to: initiate transmission of at least one first message to an initiating STA comprising one or more parameters characterizing a state of a grand master clock; and initiate transmission of burst of second messages to the initiating STA, wherein the second messages are time-stamped based, at least in part, on the state of the grand master clock. In one alternative implementation, the instructions are further executable by the one or more processors to initiate transmission of the at least one first message in response to receipt of a fine timing measurement (FTM) request message. In another alternative implementation, the FTM request message comprises one or more fields indicating an ability or preference for FTM messages or timing measurement messages as the one or more second messages. In another alternative implementation, the one or more parameters characterizing the state of the grand master clock comprise gmTimeBaseIndicator, lastGmPhase Change or scaledLastGmFreqChange, or a combination thereof.

As used herein, the term "access point" is meant to include any wireless communication station and/or device used to facilitate communication in a wireless communications system, such as, for example, a wireless local area network, although the scope of claimed subject matter is not limited in this respect. In another aspect, an access point may comprise a wireless local area network (WLAN) access point, for example. Such a WLAN may comprise a network compatible and/or compliant with one or more versions of IEEE standard 802.11 in an aspect, although the scope of claimed subject matter is not limited in this respect. A WLAN access point may provide communication between one or more mobile devices and a network such as the Internet, for example.

As used herein, the term "mobile device" refers to a device that may from time to time have a position location that changes. The changes in position location may comprise changes to direction, distance, orientation, etc., as a few examples. In particular examples, a mobile device may comprise a cellular telephone, wireless communication device, user equipment, laptop computer, other personal communication system (PCS) device, personal digital assistant (PDA), personal audio device (PAD), portable navigational device, and/or other portable communication devices. A mobile device may also comprise a processor and/or computing platform adapted to perform functions controlled by machine-readable instructions.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involve physical manipulation of physical quantities. Typically, although not necessarily, such quantities may take the form of electrical and/or magnetic signals and/or states capable of being stored, transferred, combined, compared, processed or otherwise manipulated as electronic signals and/or states representing various forms of content, such as signal measurements, text, images, video, audio, etc. It has proven convenient at times, principally for reasons of common usage, to refer to such physical signals and/or physical states as bits, values, elements, symbols, characters, terms, numbers, numerals, messages, frames, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically represented as physical electronic and/or magnetic quantities within memories, registers, and/or other storage devices, transmission devices, and/or display devices of the special purpose computer and/or similar special purpose computing and/or network device. In the context of this particular patent application, as mentioned, the term "specific apparatus" may include a general purpose computing and/or network device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation and/or a physical change and/or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

Wireless communication techniques described herein may be in connection with various wireless communications networks such as a wireless wide area network ("WWAN"), a wireless local area network ("WLAN"), a wireless personal area network (WPAN), and so on. In this context, a "wireless communication network" comprises multiple devices or nodes capable of communicating with one another through one or more wireless communication links. As shown in FIG. 1, for example, a wireless communication network may comprise two or more devices from mobile devices 100a, 100b, 115a and 115b. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A CDMA network may implement one or more radio access technologies ("RATs") such as cdma2000, Wideband-CDMA ("WCDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and WCDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a femtocell, utilized to extend cellular telephone service into a business or home. In such an implementation, one or more mobile devices may communicate with a femtocell via a code division multiple access ("CDMA") cellular communication protocol, for example, and the femtocell may provide the mobile device access to a larger cellular telecommunication network by way of another broadband network such as the Internet.

Techniques described herein may be used with an SPS that includes any one of several GNSS and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

Likewise, in this context, the terms "coupled", "connected," and/or similar terms are used generically. It should be understood that these terms are not intended as synonyms. Rather, "connected" is used generically to indicate that two or more components, for example, are in direct physical, including electrical, contact; while, "coupled" is used generically to mean that two or more components are potentially in direct physical, including electrical, contact; however, "coupled" is also used generically to also mean that two or more components are not necessarily in direct contact, but nonetheless are able to co-operate and/or interact. The term coupled is also understood generically to mean indirectly connected, for example, in an appropriate context.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more examples; however, again, particular context of description and/or usage provides helpful guidance regarding inferences to be drawn.

In this context, the term network device refers to any device capable of communicating via and/or as part of a network and may comprise a computing device. While network devices may be capable of sending and/or receiving signals (e.g., signal packets and/or frames), such as via a wired and/or wireless network, they may also be capable of performing arithmetic and/or logic operations, processing and/or storing signals, such as in memory as physical memory states, and/or may, for example, operate as a server in various embodiments. Network devices capable of operating as a server, or otherwise, may include, as examples, dedicated rack-mounted servers, desktop computers, laptop computers, set top boxes, tablets, netbooks, smart phones, wearable devices, integrated devices combining two or more features of the foregoing devices, the like or any combination thereof. Signal packets and/or frames, for example, may be exchanged, such as between a server and a client device and/or other types of network devices, including between wireless devices coupled via a wireless network, for example. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description a network device (also referred to as a networking device) may be embodied and/or described in terms of a computing device. However, it should further be understood that this description should in no way be construed that claimed subject matter is limited to one embodiment, such as a computing device and/or a network device, and, instead, may be embodied as a variety of devices or combinations thereof, including, for example, one or more illustrative examples.

References throughout this specification to one implementation, an implementation, one embodiment, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope, for example. In general, of course, these and other issues vary with context. Therefore, particular context of description and/or usage provides helpful guidance regarding inferences to be drawn.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. A method, at a first wireless station (STA), comprising:
   receiving one or more first messages from a second STA comprising one or more parameters representing a state of a grand master clock, wherein the one or more parameters representing the state of the grand master clock indicate a value of a current state of the grand master clock with respect to a prior state of the grand master clock or identify a source of the grandmaster clock, or a combination thereof, wherein the one or more parameters comprise indication of a fractional frequency offset of the current state of the grand master clock relative to a previous state of the grand master clock;

synchronizing a first clock maintained at the first STA with a second clock maintained at the second STA based, at least in part, on the one or more parameters representing the state of the grandmaster clock and an expected difference between a first drift of the first clock and a second drift of the second clock; and measuring a time of flight of a third message transmitted from the second STA to the first STA based, at least in part, on the synchronized first clock, the time of flight to be utilized to determine a range between the first STA and the second STA.

2. The method of claim 1, and further comprising computing the expected difference based, at least in part, on arrival times of second messages at the first STA transmitted in bursts from the second STA.

3. The method of claim 2, and further comprising computing the expected difference based, at least in part, on a Neighbor Rate Ratio.

4. The method of claim 2, wherein the second messages comprise fine timing measurement (FTM) messages.

5. The method of claim 1, wherein the first STA comprises a first wireless audio speaker device and the second STA comprises a second wireless audio speaker device, and wherein the method further comprises:

transmitting one or more third messages to a third wireless audio speaker device, the one or more third messages comprising one or more parameters based, at least in part, on the synchronized first clock.

6. The method of claim 1, wherein the one or more first messages are transmitted by the second STA in response to at least one fine timing measurement (FTM) request message, the FTM request message comprising one or more fields indicating an ability or preference for FTM messages or timing measurement messages as the one or more first messages.

7. The method of claim 1, wherein the first STA comprises an initiating STA, and the second STA comprises a responding STA.

8. A first wireless station (STA), comprising:
a wireless transceiver to transmit messages to and receive messages from a wireless communication network;
a first clock; and
one or more processors configured to:
obtain one or more first messages received at the wireless transceiver from a second STA comprising one or more parameters representing a state of a grand master clock, wherein the one or more parameters representing the state of the grand master clock indicate a value of a current state of the grand master clock with respect to a prior state of the grand master clock or identify a source of the grand master clock, or a combination thereof, wherein the one or more parameters comprise indication of a fractional frequency offset of the current state of the grand master clock relative to a previous state of the grand master clock;

synchronize the first clock with a second clock maintained at the second STA based, at least in part, on the one or more parameters representing the state of the grand master clock and an expected difference between a first drift of the first clock and a second drift of the second clock; and measure a time of flight of a third message transmitted from the second STA to the first STA based, at least in part, on the synchronized first clock, the time of flight to be utilized to determine a range between the first STA and the second STA.

9. The first STA of claim 8, wherein the one or more processors are further configured to compute the expected difference based, at least in part, on arrival times of second messages at the first STA transmitted in bursts from the second STA.

10. The first STA of claim 9, wherein the one or more processors are further configured to compute the expected difference based, at least in part, on a Neighbor Rate Ratio.

11. The first STA of claim 9, wherein the second messages comprise fine timing measurement (FTM) messages.

12. The first STA of claim 8, wherein the first STA comprises a first wireless audio speaker device and the second STA comprises a second wireless audio speaker device, and wherein the one or more processors are further configured to:

initiate transmission of one or more third messages to a third wireless audio speaker device, the one or more third messages comprising one or more parameters based, at least in part, on the synchronized first clock.

13. The first STA of claim 8, wherein the one or more first messages are transmitted by the second STA in response to at least one fine timing measurement (FTM) request message, the FTM request message comprising one or more fields indicating an ability or preference for FTM messages or timing measurement messages as the one or more first messages.

14. The first STA of claim 8, wherein the first STA comprises an initiating STA, and the second STA comprises a responding STA.

15. A non-transitory storage medium comprising machine-readable instructions stored thereon which are executable by one or more processors of a first wireless station (STA) to:

obtain one or more first messages received from a second STA comprising one or more parameters representing a state of a grand master clock, wherein the one or more parameters representing the state of the grand master clock indicate a value of a current state of the grand master clock with respect to a prior state of the grand master clock or identify a source of the grand master clock, or a combination thereof, wherein the one or more parameters comprise indication of a fractional frequency offset of the current state of the grand master clock relative to a previous state of the grand master clock;

synchronize a first clock maintained at the first STA with a second clock maintained at the second STA based, at least in part, on the one or more parameters representing the state of the grand master clock and an expected difference between a first drift of the first clock and a second drift of the second clock; and measure a time of flight of a third message transmitted from the second STA to the first STA based, at least in part, on the synchronized first clock, the time of flight to be utilized to determine a range between the first STA and the second STA.

16. The non-transitory storage medium of claim 15, wherein the instructions are further executable by the one or more processors to compute the expected difference based, at least in part, on arrival times of second messages at the first STA transmitted in bursts from the second STA.

17. The non-transitory storage medium of claim 16, wherein the instructions are further executable by the one or more processors to compute the expected difference based, at least in part, on a Neighbor Rate Ratio.

18. The non-transitory storage medium of claim 16, wherein the second messages comprise fine timing measurement (FTM) messages.

19. The non-transitory storage medium of claim 15, wherein the first STA comprises a first wireless audio speaker device and the second STA comprises a second wireless audio speaker device, and wherein the instructions are further executable by the one or more processors to:

initiate transmission of one or more third messages to a third wireless audio speaker device, the one or more third messages comprising one or more parameters based, at least in part, on the synchronized first clock.

20. The non-transitory storage medium of claim 15, wherein the one or more first messages are transmitted by the second STA in response to at least one fine timing measurement (FTM) request message, the FTM request message comprising one or more fields indicating an ability or preference for FTM messages or timing measurement messages as the one or more first messages.

21. The non-transitory storage medium of claim 15, wherein the first STA comprises an initiating STA, and the second STA comprises a responding STA.

22. A first wireless station (STA), comprising:

means for receiving one or more first messages from a second STA comprising one or more parameters representing a state of a grand master clock, wherein the one or more parameters representing the state of the grand master clock indicate a value of a current state of the grand master clock with respect to a prior state of the grand master clock or identify a source of the grand master clock, or a combination thereof, wherein the one or more parameters comprise indication of a fractional frequency offset of the current state of the grand master clock relative to a previous state of the grand master clock;

means for synchronizing a first clock maintained at the first STA with a second clock maintained at the second STA based, at least in part, on the one or more parameters representing the state of the grand master clock and an expected difference between a first drift of the first clock and a second drift of the second clock; and means for measuring a time of flight of a third message transmitted from the second STA to the first STA based, at least in part, on the synchronized first clock, the time of flight to be utilized to determine a range between the first STA and the second STA.

23. The first STA of claim 22, and further comprising computing the expected difference based, at least in part, on arrival times of second messages at the first STA transmitted in bursts from the second STA.

24. The first STA of claim 23, and further comprising computing the expected difference based, at least in part, on a Neighbor Rate Ratio.

25. The first STA of claim 23, wherein the second messages comprise fine timing measurement (FTM) messages.

26. The first STA of claim 22, wherein the first STA comprises a first wireless audio speaker device and the second STA comprises a second wireless audio speaker device, and wherein the first STA further comprises:

means for transmitting one or more third messages to a third wireless audio speaker device, the one or more third messages comprising one or more parameters based, at least in part, on the synchronized first clock.

27. The first STA of claim 22, wherein the first STA comprises an initiating STA, and the second STA comprises a responding STA.

* * * * *